June 4, 1957 G. M. DICK 2,794,527
STATIONARY FLUID MOTOR OPERATED CLUTCH
Filed March 19, 1954
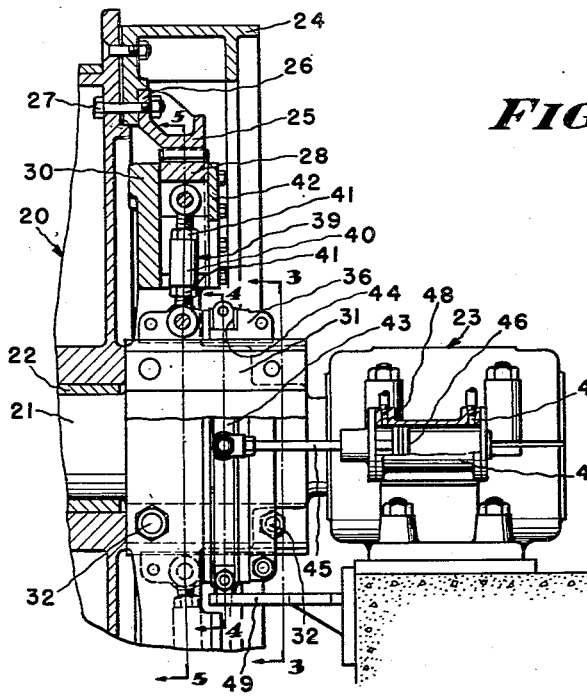
FIG. 1
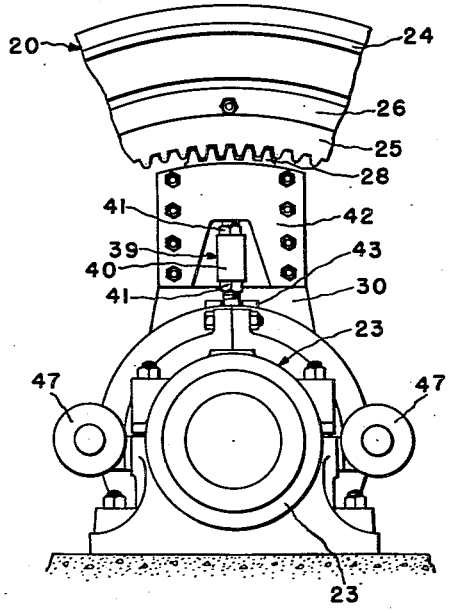
FIG. 2
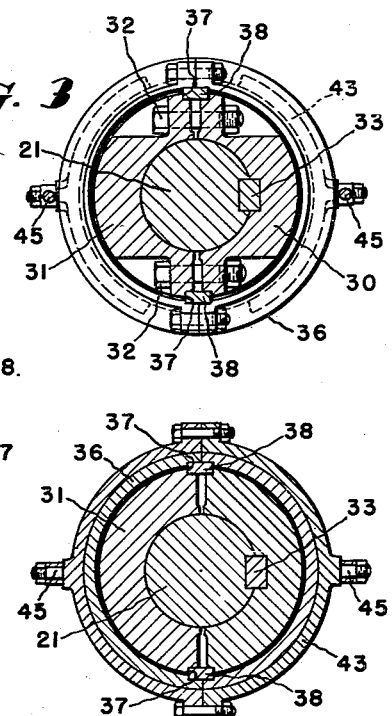
FIG. 3
FIG. 4
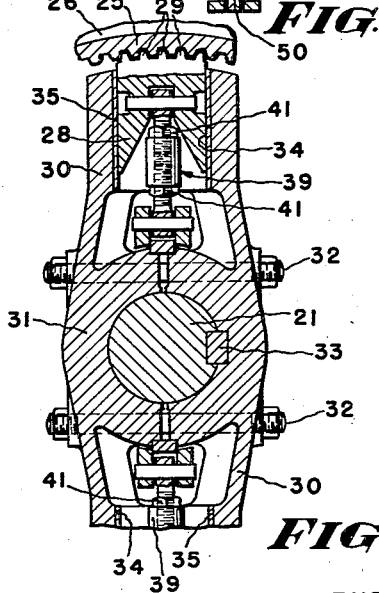
FIG. 5
INVENTOR
GEORGE M. DICK
BY 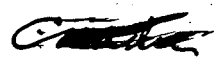
HIS ATTORNEY

# United States Patent Office 2,794,527
Patented June 4, 1957

2,794,527
STATIONARY FLUID MOTOR OPERATED CLUTCH

George M. Dick, Sherbrooke, Quebec, Canada, assignor to Ingersoll-Rand Company, New York, N. Y., a corporation of New Jersey Application March 19, 1954, Serial No. 417,323

1 Claim. (Cl. 192—85)

This invention relates to clutches.

The invention has for its object to provide an improved and relatively simplified construction for a clutch which is limited and positive in its operation.

The invention will be more clearly understood by reference to the drawings which illustrate a preferred embodiment of the invention and in which:

Fig. 1 is a side view, partly in section, of a portion of a mine hoist, equipped with a clutch constructed in accordance with the practice of the invention, portions of the drum and the spider of the clutch being shown in longitudinal section, Fig. 2 is an end view of the clutch and a portion of the hoist drum, Fig. 3 is a cross section taken along the line 3—3 of Fig. 1 looking in the direction of the arrows, Fig. 4 is a section taken along the line 4—4 of Fig. 1 looking in the direction of the arrows, and Fig. 5 is a cross section taken along the line 5—5 of Fig. 1 looking in the direction of the arrows.

Referring to the drawing and more particularly to Fig. 1, the invention is shown as applied to a mine hoist including a rope drum 20 mounted rotatably on a drive shaft 21 provided with a sleeve bearing 22. The shaft 21 is provided with a suitable out-board bearing 23 of any well known construction. Substantially at the perimeter of the drum 20 is bolted an axially extended flange 24 which may serve as a brake drum.

Within the clutch drum is mounted a member to be gripped which, in this instance, is an internal tooth member 25 having a radial flange 26, bolts 27 being provided to secure the flange 26 and the brake drum 24 to the drum 20. The internal gear 25 is adapted to be gripped by members each in the form of a sliding block 28 provided at its end with a series of teeth 29, which are adapted to engage the teeth of the internal gear 25.

The sliding blocks 28 are mounted slidably in arms 30 forming a spider having a hub 31 preferably in two pieces and bolted together securely on the shaft 21 as at 32, a key 33 being provided to prevent rotation therebetween. The blocks 28 are adapted to slide in radially extending slots 34 provided in the ends of the spider arms 30 provided with liners 35.

Means is provided for moving the sliding blocks 28 into engagement with the internal gear 25, and to this end a sleeve 36 is mounted on the hub 31 being suitably slotted as at 37 to receive keys 38 mounted in the hub 31. The sleeve 36 is thus axially movable on the hub 31 while being rotatable therewith. The sliding blocks 28 are coupled to the sleeve 36 by means of links 39 each pivoted at one end in the sliding blocks 28 and at the other end in the sleeve 36. Each link 39 is adjustable as to length in any suitable manner, in this instance being provided with a turnbuckle construction consisting of a central collar 40 oppositely threaded at its ends and adapted to receive the threaded ends of the link, the adjustment being locked by suitable jam nuts 41.

Sliding block 28 is held in the slotted end of the spider arm 30 by means of a confining plate 42 bolted thereto. The sleeve 36 is actuated longitudinally with respect to the hub 31 by means of a split collar 43, having a running-fit in a groove 44 in the sleeve 36, and to which are pivotally attached a pair of piston rods 45 attached to the pistons 46 within air cylinders 47. Actuating air is adapted to be supplied to the opposite ends of the cylinders 47 at suitable inlet ports 48 located at opposite ends of the cylinders. Rotation of the split collar 43 is prevented by a slotted stationary bracket arm 49 which is adapted to engage a projecting lug 50 on the split collar 43.

In operation, the clutch is engaged by admitting air to the right hand port of the cylinders 47 forcing the pistons 46 and its associated piston rods 45 outwardly (to the left). This forces the split collar 43 to slide inwardly toward the drum 20 transmitting its motion through the links 39 to the sliding blocks 28 thus moving them radially into engagement with the internal gear 25. The spider arms 30 thus couple the shaft 21 to the drum 20.

The shaft 21 is uncoupled from the drum 20 by exhausting the air from the cylinders and admitting live air through the other ports 48, at the opposite end of the cylinders 47 (left hand end) thereby pulling the split collar 43 in the opposite direction causing the sleeve 36 to pull the inner ends of the links 39 outwardly (to the right), thereby withdrawing the sliding blocks 28 from engagement with the internal tooth member 25.

Preferably, the motion of the sleeve 36 inwardly (to the left) is such that the inner ends of the links 39 go past the plane of their outer ends so as to, in effect, lock the sleeve 36 in the engaged position.

It will be seen that this construction provides a rugged and simple mechanism whereby the objects hereinbefore referred to are accomplished.

I claim:

Mechanism for clutching a drive shaft to a driven member comprising a member to be gripped on the driven member, a gripping member, a spider provided with a hub fixed to the shaft and supporting the gripping member, means for moving the gripping member into engagement with the member to be gripped including a sleeve rotatable with the hub and movable axially thereof, a link coupling the sleeve with the gripping member and adapted to transmit the motion of the sleeve to the gripping member and means to actuate the sleeve longitudinally with respect to the shaft, including a collar encircling the sleeve, a pair of fluid actuated pistons connected to the collar at diametrically opposed points, a stationary guide arm having a slot extending parallel to the shaft, and a lug on the collar projecting into the slot in said arm with ample clearance to facilitate sliding therein and adapted to prevent rotation of the collar on the sleeve.

References Cited in the file of this patent

UNITED STATES PATENTS

| 1,848,397 | Swanson | Mar. 8, 1932 |
| 1,864,126 | Ferris | June 21, 1932 |
| 1,946,062 | Cramp | Feb. 6, 1934 |
| 2,342,880 | Masek | Feb. 29, 1944 |

FOREIGN PATENTS

| 2,872 | Great Britain | Feb. 6, 1903 |